Figure 1:
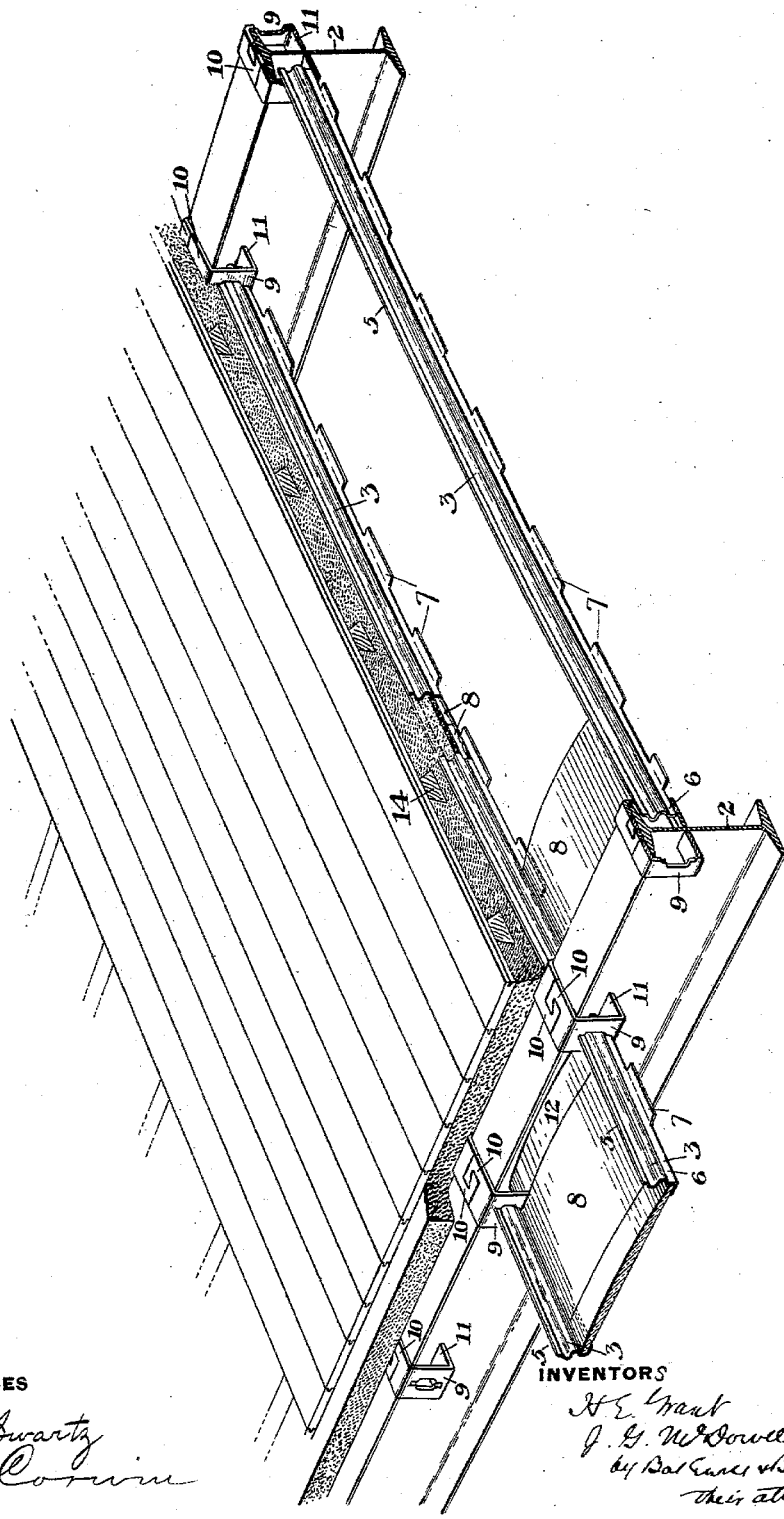

No. 716,838. Patented Dec. 23, 1902.
H. E. GRANT & J. G. McDOWELL.
FIREPROOF FLOORING.
(Application filed Nov. 12, 1901.)
(No Model.) 3 Sheets—Sheet 1.

WITNESSES

INVENTORS

No. 716,838. Patented Dec. 23, 1902.
H. E. GRANT & J. G. McDOWELL.
FIREPROOF FLOORING.
(Application filed Nov. 12, 1901.)
(No Model.) 3 Sheets—Sheet 2.
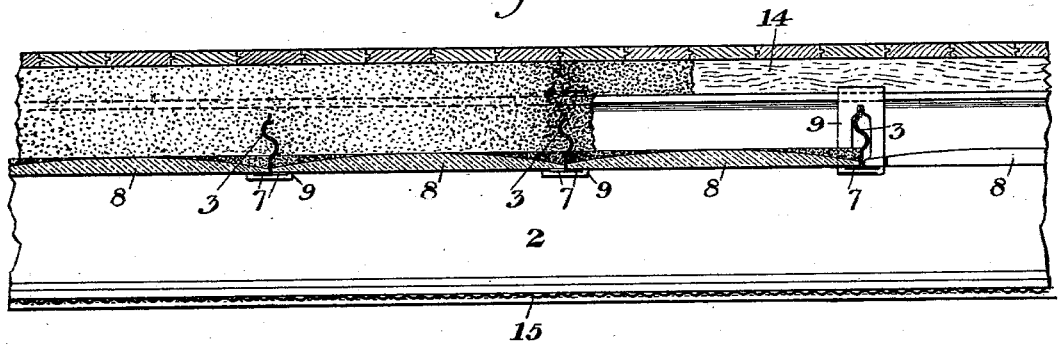
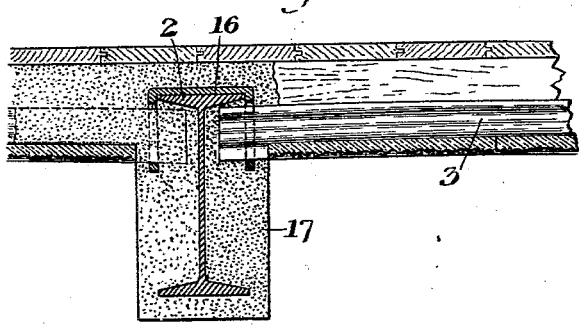
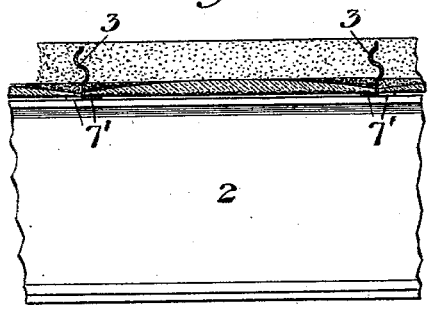
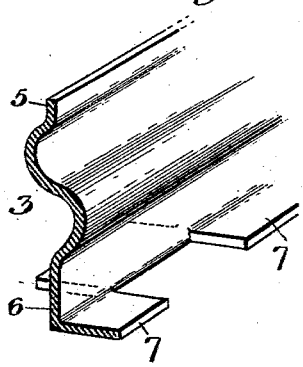
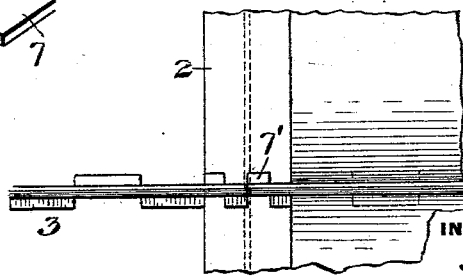
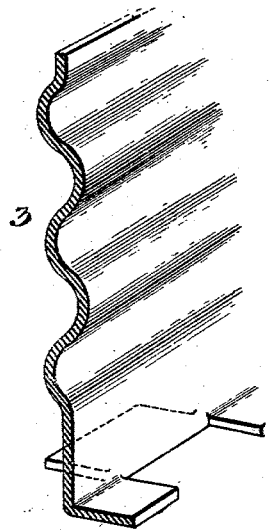
WITNESSES
INVENTORS No. 716,838. Patented Dec. 23, 1902.
H. E. GRANT & J. G. McDOWELL.
FIREPROOF FLOORING.
(Application filed Nov. 12, 1901.)
(No Model.) 3 Sheets—Sheet 3.
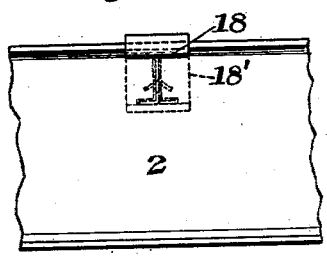
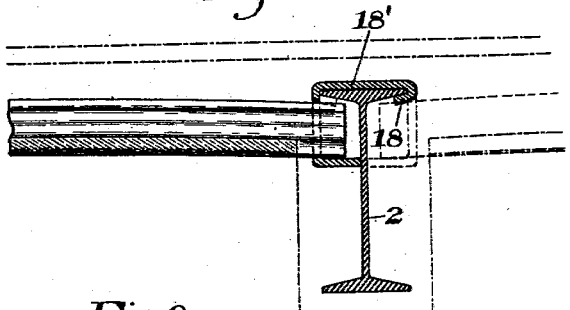
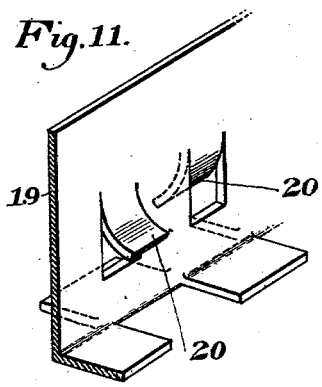
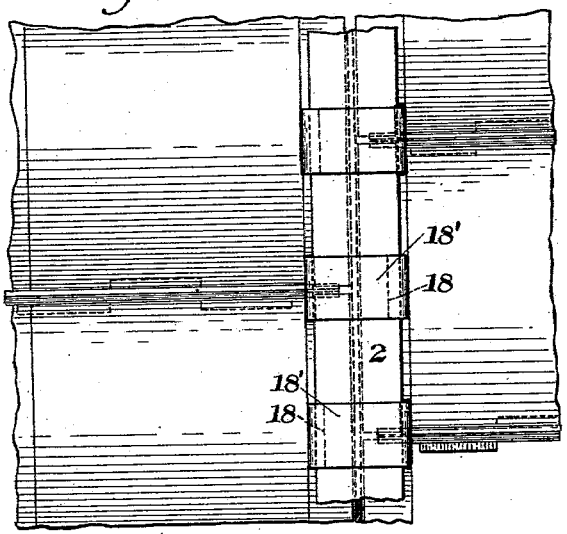
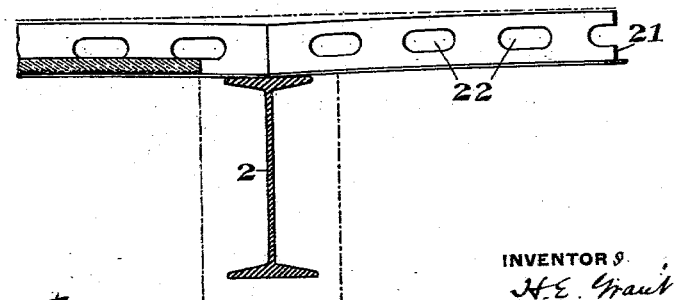
WITNESSES
INVENTORS

UNITED STATES PATENT OFFICE.

HORACE E. GRANT AND JOHN G. McDOWELL, OF PITTSBURG, PENNSYLVANIA.

FIREPROOF FLOORING.

SPECIFICATION forming part of Letters Patent No. 716,838, dated December 23, 1902.

Application filed November 12, 1901. Serial No. 81,964. (No model.)

*To all whom it may concern:*

Be it known that we, HORACE E. GRANT and JOHN G. McDOWELL, of Pittsburg, Allegheny county, Pennsylvania, have invented a new and useful Fireproof Flooring, of which the following is a full, clear, and exact description, reference being had to the accompanying drawings, forming part of this specification, in which—

Figure 1 is a perspective view, partly broken away, showing flooring constructed in accordance with our invention. Fig. 2 is a vertical cross-section of the same, partly broken away and showing the ceiling. Fig. 3 is a broken cross-section showing a modified construction. Fig. 4 is a broken cross-section showing another modification of the construction. Figs. 5 and 6 are broken perspective views showing different sizes of our improved corrugated connector. Fig. 7 is a partial top plan view of the form of Fig. 4 before the concrete is applied. Figs. 8 and 9 show, respectively, a partial section and a similar top plan showing a modified construction and arrangement of the hangers; and Figs. 10, 11, and 12 are detail views of modified forms of connectors, hereinafter referred to.

Our invention relates to that class of fireproof flooring wherein concrete is combined with metallic connectors extending between the main floor-beams. Its objects are to provide an improved form of connecting strip or bar and hanger therefor; to afford an improved method of constructing such floors whereby the use of temporary centering is done away with; to combine with the metallic connectors slabs or supports carried upon them in connection with a primary layer of grouting or cementing material, which is allowed to set and form a firm support for the concrete proper; to afford an improved refractory slab to be used in connection with the stretchers or connectors, and to cheapen and strengthen the construction of such floors.

In the drawings, referring to the form of Figs. 1 and 2, 2 2 represent the floor-beams, and 3 the metallic connectors which are preferably in the form of corrugated plates or bars, such as shown more clearly in Figs. 5 and 6. Each of these bars has an upper straight portion 5 above the corrugations, and a similar lower portion 6, from which extend on opposite sides alternate lugs or flanges 7. These lugs may be of any desirable width and length and are formed for the purpose of supporting slabs 8, which extend between the adjacent metallic connectors. These slabs are preferably formed of refractory material with a flat lower face and an arched upper face, and we prefer to embed a layer of expanded metal, wire mesh, or similar reticulated material in the lower face portion of the slab, though this may or may not be used, as desired. Plates of corrugated iron or other material may be used instead of the refractory slabs shown. We have shown the connectors 3 as supported by depending hangers 9, each of which is of general channel form, with an upper projecting hook portion 10, and a lower flange 11. The body of the hanger is provided with a central hole having upper and lower slot extensions, as shown, to receive the upper and lower straight portions of the connector. The hangers are thus made universal and may be used on either side, the lugs on the connecters being cut away at the ends and the corrugations fitting in the central hole. In assembling the parts the hooks 10 of each pair of hangers are interlocked, as shown in Fig. 1, the lower flanges extending inwardly toward the web of the floor-beam, and in addition to the slabs 8 we preferably provide narrow slabs 12, which are of a suitable width corresponding to the lower flanges of the hangers and rest upon these flanges.

The metallic connectors are preferably given a small camber, as shown in Fig. 1, thus arching them slightly to allow for slight sagging under the weight of the slabs.

In building the floor the hangers and connectors are assembled upon the floor-beams, the slabs are laid upon the flanges or lugs of the connectors, and a grouting or layer of cement or similar material is filled in upon the slabs to a sufficient degree to bind them together when allowed to set. This grouting may be and preferably is thicker at the sides than at the centers of the slabs, as shown in Fig. 1, and when allowed to set it binds the slabs and connectors together and forms a solid support for the concrete proper. This concrete is then tamped in in the usual manner, incasing the corrugated portions of the connectors and extending above them and receiving the floor-sleepers 14 of the usual form. The connectors and bonded slabs thus do away with the use of centering and form the support for the concrete until the concrete is set. A strong and simple construction is thus afforded, which can be rapidly and easily formed. In these figures we have shown a plain flat ceiling 15, formed of metallic lath and plaster, secured to the lower flanges of the floor-beams and to connectors between them.

In Fig. 3 we show a form similar to that of Figs. 1 and 2, except that a plain stirrup 16, having two depending legs, is used instead of the interlocking hangers, and in this form the narrow slabs are not used, a beam finish being given by molding a body of concrete 17 around the web and lower flanges of the floor-beam, this being integrally united with the concrete incasing the connectors.

In Figs. 4 and 7 we show the corrugated connectors as set upon the tops of the floor-beam, and in this case the flanges or lugs 7' at the ends of the connectors where they meet midway of the upper face of the floor-beam are cut so as to form a base which will hold the connector in vertical position during the operation of forming the floor.

In Figs. 8 and 9 we show our preferred construction and arrangement of the hangers and the connectors. The hanger in this case is similar to that of Fig. 1, except that the upper flange is extended and formed with a hook portion 18, which engages the opposite upper flange of the floor-beam, and the connectors upon one side of the floor-beam are staggered relatively to those upon the other side, so that the one hanger for the connector on one side is between the pair of those on the opposite side. This we believe to be a new arrangement of the hanger and desire to cover the same broadly independent of the particular type of connector or concrete construction.

Instead of using a corrugated connector we may use a flat plate 19, as shown in Figs. 10 and 11, and having intermediate inclined lugs 20, projecting on opposite sides thereof, being cut and struck up from the body of the plate. In this case the hanger 18', having recesses to receive either of the lugs 20, as shown in Fig. 10, may be used. We may also use as a connector a rolled T-bar 21, as shown in Fig. 12, which may either rest on top of the floor-beams or be hung intermediately thereof, as desired, and we preferably provide slots 22 in such T-bar to allow the concrete to lock itself through the bars.

The advantages of our construction flow first from the use of the slabs or plates carried on the connectors and grouted or cemented together before the main layer of concrete is applied, since this dispenses with the use of centerings. The vertically-extending corrugated plate or strip is of especial advantage, since when the corrugations are embedded in the concrete interlocking ribs and recesses of concrete are formed in the corrugations which prevent collapsing and afford a construction of great strength. The use of the hangers with the flanges projecting toward the beam is of advantage for supporting the narrow slabs, though any hangers may be used. The construction lends itself readily to any desired thickness or arrangement of flooring and ceiling.

Many changes may be made in the form of the connectors, the supporting slabs or plates, the hangers, and other parts without departing from our invention.

We claim—

1. The method of making fireproof flooring, consisting in supporting a series of previously-formed slabs or plates upon connectors, applying to said slabs a layer of cement material capable of setting, allowing the material to set and bind the slabs to form a permanent floor, and then filling in concrete above and in contact with the first floor-layer; substantially as described.

2. Fireproof flooring comprising main floor-beams, metallic connectors supported upon said beams independently of their lower flanges, previously-formed plates resting upon and carried by the connectors, a layer of grouting or cement binding the plates together, and a filling of concrete at least partially incasing the connectors and covering the grouting and plates; substantially as described.

3. Fireproof flooring comprising main floor-beams, metallic connectors extending between and supported upon said beams, previously-formed slabs or plates carried on the connectors and secured by a preliminary set layer of cementing material, providing a first-formed permanent supporting-floor, and an after-applied filling of concrete resting upon the floor and supported thereby until set; substantially as described.

4. Fireproof flooring containing connectors supported upon the main beams, each connector consisting of a longitudinally-corrugated plate or strip of single thickness supported on edge and having lower projections on opposite sides, plates resting upon said projections, and concrete embedding at least a part of the corrugation; substantially as described.

5. Fireproof flooring comprising a series of metallic connectors supported upon the floor-beams above their lower flanges, each connector consisting of a longitudinally-corrugated plate or strip of single thickness supported on edge and having lower projections on opposite sides, plates resting upon the projections above the level of the lower floor-beam flanges, and concrete supported on the plates and embedding the corrugations; substantially as described.

6. In fireproof construction, a series of hangers supported on the floor-beams, the hangers on one side being staggered relatively to those on the other side of the floor-beams, and metallic connectors supported on said hangers above the lower flanges of the floor-beam; substantially as described.

7. Fireproof flooring containing hangers resting on the floor-beams, metallic connectors carried upon the hangers, said hangers having lower portions projecting toward the floor-beam webs, and narrow plates or slabs carried upon said inwardly-projecting portions; substantially as described.

8. Fireproof flooring containing main floor-beams, metallic connectors supported upon said beams and having lower projections, previously-formed plates resting upon and lying wholly above the projections on the connectors, a layer of grouting or cement binding the plates together, and a filling of concrete overlying the grouting and plates; substantially as described.

9. Fireproof flooring comprising metallic connectors having vertical web portions secured to the main floor-beams above their lower flanges, plates or slabs supported upon the connectors, grouting or cement overlying the slabs or plates, and a separate layer of concrete over the grouting and slabs and inclosing the connectors; substantially as described.

10. Fireproof flooring comprising metallic connectors supported upon the floor-beams, refractory slabs supported upon the connectors above the level of the lower flanges of the floor-beam, said slabs having reticulated metal embedded in their lower portions, and concrete overlying the slabs; substantially as described.

11. Fireproof flooring comprising main floor-beams, metallic connectors supported on the floor-beams above and independent of their lower flanges, previously-formed plates resting upon the connectors, a preliminary layer of grouting or cement on the plates arranged to bind them together, and a filling of concrete above the previously-set layer of cement; substantially as described.

12. Fireproof flooring having previously-formed plates or slabs supported between the main floor-beams and above their lower flanges, a layer of grouting or cement material capable of setting over the plates, and a filling of concrete over the previously-set layer of cement material and in contact with the same; substantially as described.

In testimony whereof we have hereunto set our hands.

HORACE E. GRANT.
JOHN G. McDOWELL.

Witnesses:
H. M. CORWIN,
L. M. REDMAN.